(12) United States Patent
Johnson et al.

(10) Patent No.: US 7,409,007 B1
(45) Date of Patent: Aug. 5, 2008

(54) METHOD AND APPARATUS FOR REDUCING ADJACENT CHANNEL POWER IN WIRELESS COMMUNICATION SYSTEMS

(75) Inventors: Robert Everest Johnson, Randolph, NJ (US); Mark Thomas Leney, West Orange, NJ (US); George Philip Vella-Coleiro, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,490

(22) Filed: Sep. 14, 1999

(51) Int. Cl.
*H04L 25/49* (2006.01)
(52) U.S. Cl. .................................................. 375/296
(58) Field of Classification Search ......... 375/295–297; 455/63.1
See application file for complete search history.

(56) References Cited

U.S. PATENT DOCUMENTS

| | | | |
|---|---|---|---|
| 5,867,065 A | 2/1999 | Leyendecker | 330/149 |
| 5,920,808 A * | 7/1999 | Jones et al. | 455/127 |
| 5,923,712 A * | 7/1999 | Leyendecker et al. | 375/297 |
| 5,963,549 A * | 10/1999 | Perkins et al. | 370/342 |
| 6,288,610 B1 * | 9/2001 | Miyashita | 330/149 |
| 6,493,543 B1 * | 12/2002 | Shin et al. | 455/126 |
| 6,507,732 B1 | 1/2003 | Dajer et al. | |
| 6,614,854 B1 * | 9/2003 | Chow et al. | 375/297 |

FOREIGN PATENT DOCUMENTS

| | | |
|---|---|---|
| EP | 0 751 630 A2 | 1/1997 |
| EP | 0 881 807 A1 | 1/1997 |
| WO | WO 99/33170 | 7/1999 |

OTHER PUBLICATIONS

J. A. Nelder et al., "A Simplex Method For Function Minimization," *Computer Journal*, vol. 7, pp. 308-313 (1965).
Claudio G. Rey, "Predistorter Linearizes CDMA Power Amplifiers," *Microwaves & RF*, pp. 114, 116, 119-120, 122-123 (Oct. 1998).
Lars Sundstrom et al., "Quantization Analysis and Design of a Digital Predistortion Linearizer for RF Power Amplifiers," *IEEE Transactions on Vehicular Technology*, vol. 45, No. 4, pp. 707-719 (Nov. 1996).
T. Louie Valeña, *An Adaptive Predistorter for TDMA Transmitters Using a Heterodyne Architecture*, 1999 IEEE 49th Vehicular Technology Conference, Houston, TX, May 16-20, 1999, IDDD Vehicular Technology Conference, New York, NY, IEEE, US, vol. 3, Conf. 49, May 16, 1999, pp. 1915-1919, XP000936145, ISBN: 0-7803-5566-0, abstract, Figure 2.
Yuguang Huang and W. F. McColl, *An Improved Simplex Method for Function Minimization*, Systems, May and Cybernetics, 1996, IEEE International Conference on Beijing, China, Oct. 14-17, 1996, New York, NY, USA, IEEE, US, Oct. 14, 1996, pp. 1702-1705, XP010206741, ISBN: 0-7803-3280-6, abstract.

* cited by examiner

*Primary Examiner*—Kevin M Burd

(57) ABSTRACT

This invention relates to a method and apparatus for reducing adjacent channel power in wireless communication systems. More particularly, the present invention is directed to a system for digitally and adaptively pre-distorting a signal that includes applying a correction to the signal before it is applied to the input of an amplifier such that the correction is equal and opposite to anticipated distortion produced by the amplifier. Thus, the correction and the amplifier distortion cancel one another resulting in a system with an overall linear transfer characteristic. In these circumstances, the adjacent channel power is desirably reduced.

18 Claims, 6 Drawing Sheets

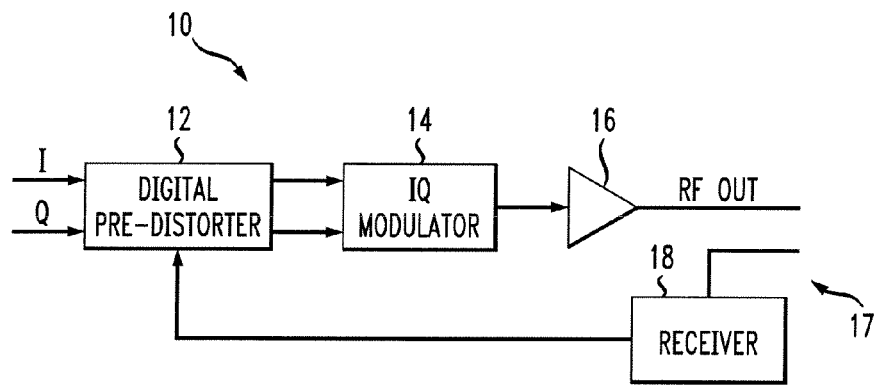
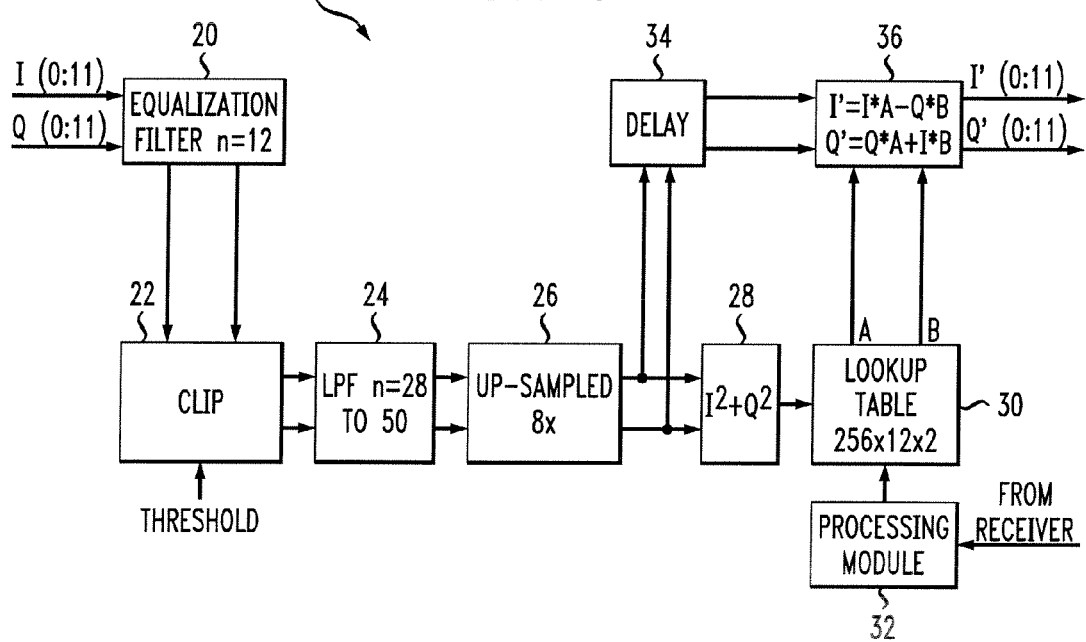

METHOD AND APPARATUS FOR REDUCING ADJACENT CHANNEL POWER IN WIRELESS COMMUNICATION SYSTEMS

CROSS REFERENCE TO RELATED APPLICATION

This application is related to U.S. application Ser. No. 09/396,829 entitled "Dynamic Path Gain Compensation for Radios in Wireless Communication Systems" filed on even date herewith on behalf of Miguel Dajer, Edward Ellis Eibling and Mark Y. McKinnon, now U.S. Pat. No. 6,507,732 (issued Jan. 14, 2003), which is hereby incorporated herein by this reference.

BACKGROUND OF THE INVENTION

This invention relates to a method and apparatus for reducing adjacent channel power in wireless communication systems. More particularly, the present invention is directed to a system for digitally and adaptively pre-distorting a signal that includes applying a correction to the signal before it is applied to the input of an amplifier such that the correction is equal and opposite to anticipated distortion produced by the amplifier. Thus, the correction and the amplifier distortion cancel one another resulting in a system with an overall linear transfer characteristic. In these circumstances, the adjacent channel power is desirably reduced.

While the invention is particularly directed to the art of reducing adjacent channel power in wireless communication systems and finds particular application in base stations, and will be thus described with specific reference thereto, it will be appreciated that the invention may have usefulness in other fields and applications. For example, the invention may be applied to wireless telephone units and other such devices.

By way of background, modern wireless communication systems require tight control of adjacent channel power (ACP) in order to avoid interference with neighboring channels. This requirement places a heavy burden on transmission power amplifiers of base stations which require a high degree of linearity to avoid generating spurious out-of-channel emissions while maintaining high power efficiency to minimize temperature rise and maximize reliability. These constraints are particularly severe for code division multiple access (CDMA) systems where the pseudo-random nature of the signal results in a peak power which exceeds the average power by a factor of ten or more.

In order to achieve reasonable power efficiency, base station amplifiers are typically designed to operate in class AB mode. Unfortunately, the transfer characteristic of the amplifier departs substantially from linear when in class AB mode. This results in unacceptably high ACP. The traditional method of linearizing the amplifier is to employ adaptive feed-forward which, while effective, results in a substantial cost increase.

The present invention contemplates a new method and apparatus for reducing adjacent channel power in wireless communication systems that resolve the above-referenced difficulties and others.

SUMMARY OF THE INVENTION

A method and apparatus for reducing adjacent channel power in wireless communication systems are provided. The system digitally and adaptively pre-distorts a base-band signal having an in-phase component and a quadrature component. The base-band signal is generated by a communication device.

In one aspect of the invention, the apparatus comprises a clipping module operative to clip the base-band signal to produce a clipped signal, a filter module operative to filter the clipped signal to eliminate high frequency components of the clipped signal and to produce a filtered signal, a sampling module operative to increase the sampling rate of the filtered signal to obtain an upsampled signal, an index calculating module operative to calculate index values based on the in-phase component and quadrature component of the base-band signal, a look-up table having stored therein parameters—the parameters being retrievable based on the index values, an output module operative to generate an output signal based on the parameters retrieved from the look-up table and the upsampled signal, a receiver operative to retrieve samples of RF signals generated based on the output signals, and a processor operative to provide adaptive feedback to the look-up table based on the samples.

In another aspect of the invention, the sampling module increases the sampling rate by a factor of four.

In another aspect of the invention, the index values are calculated by summing the squares of the in-phase component and the quadrature component.

In another aspect of the invention, the index values are the instantaneous power envelopes of the base-band signals.

In another aspect of the invention, the parameters are derived from polynomial equations having coefficients.

In another aspect of the invention, the parameters are defined as A and B and the polynomial equations are as follows:

$$A = C_0 + C_1 P + C_2 P^2 + C_3 P^3 \text{ for } A \leq A_m$$

$$A = A_m \text{ otherwise}$$

$$B = C_4 P + C_5 P^2 + C_6 P^3 \text{ for } P \leq P_b$$

$$B = (B_{b1} - B_{b2}) + C_7 P + C_8 P^2 + C_9 P^3 \text{ for } P > P_b$$

where $P = (I^2 + Q^2)$ is the instantaneous envelope power, $A_m$ is a maximum value imposed on A to prevent the amplifier from being driven deep into saturation, $P_b$ is a breakpoint where the B parameter transitions from one polynomial equation to the other, $B_{b1}$ and $B_{b2}$ are the values of B at $P = P_b$ using the first and second polynomial, respectively, and $C_0$ through $C_9$ are coefficients which pertain to a particular amplifier and which can vary with temperature, aging of the amplifier components, etc.

In another aspect of the invention, the adaptive feedback optimizes the coefficients.

In another aspect of the invention, the apparatus further comprises a delay module positioned between the sampling module and the output module.

In another aspect of the invention, a method for adaptively predistorting the base-band signal comprises generating the base-band signal by a communication device, clipping the base-band signal to produce a clipped signal, filtering the clipped signal to eliminate high frequency components of the clipped signal to produce a filtered signal, increasing the sampling rate of the filtered signal to obtain an upsampled signal, obtaining predistortion parameters, outputting an output signal based on the predistortion parameters and the upsampled signal, sampling RF signals generated based on the output signals, and providing adaptive feedback based on the sampling.

In another aspect of the invention, the increasing of the sampling rate comprises increasing the sampling rate by a factor of four.

In another aspect of the invention, the obtaining of the parameters includes calculating an index value by summing squares of the in-phase component and the quadrature component.

In another aspect of the invention, the obtaining further comprises retrieving the parameters from a look-up table.

In another aspect of the invention, the method further comprises deriving the parameters from polynomial equations having coefficients.

In another aspect of the invention, the parameters are derived by defining the parameters as A and B and manipulating the polynomial equations as follows:

$$A = C_0 + C_1 P + C_2 P^2 + C_3 P^3 \text{ for } A \leq A_m$$

$$A = A_m \text{ otherwise}$$

$$B = C_4 P + C_5 P^2 + C_6 P^3 \text{ for } P \leq P_b$$

$$B = (B_{b1} - B_{b2}) + C_7 P + C_8 P^2 + C_9 P^3 \text{ for } P > P_b$$

where $P=(I^2+Q^2)$ is the instantaneous envelope power, $A_m$ is a maximum value imposed on A to prevent the amplifier from being driven deep into saturation, $P_b$ is a breakpoint where the B parameter transitions from one polynomial equation to the other, $B_{b1}$ and $B_{b2}$ are the values of B at $P=P_b$ using the first and second polynomial, respectively, and $C_0$ through $C_9$ are coefficients.

In another aspect of the invention, the method further comprises delaying input of the up-sampled signal to the output module.

In another aspect of the invention, a system comprises means for generating the base-band signal by a communication device, means for clipping the base-band signal to produce a clipped signal, means for filtering the clipped signal to eliminate high frequency components of the clipped signal to produce a filtered signal, means for increasing the sampling rate of the filter signal to obtain an up-sampled signal, means for calculating an index value based on the in-phase component and quadrature component, means for retrieving parameters from a look-up table, the retrieving being based on the index values, means for outputting an output signal based on the parameters retrieved from the look-up table and the up-sampled signal, means for sampling RF signals generated based on the output signals and means for providing adaptive feedback to the look-up table based on the sampling.

In another aspect of the invention, the apparatus comprises a sampling module to increase the sampling rate of the signal to obtain an upsampled signal, a module operative to calculate predistortion parameters, an output module operative to generate an output signal based on the predistortion parameters and the upsampled signal, a receiver operative to retrieve samples of RF signals generated based on the output signals, and a processor operative to provide adaptive feedback based on the samples.

A primary advantage of the present invention is that it provides an efficient and reliable alternative method to reduce adjacent channel power by adaptively and digitally pre-distorting the signal to compensate for the non-linearity of the amplifier.

Another advantage of the present invention is that the correction of the signal is performed on the digital base-band signal before it is converted to a radio frequency (RF) signal. In this way, the precision and efficient implementation of digital circuitry is utilized.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 1 is an overall block diagram of a system according to the present invention;

FIG. 2 is a block diagram of a digital predistorter according to the present invention;

DETAILED DESCRIPTION OF THE EMBODIMENTS

Figure 3:
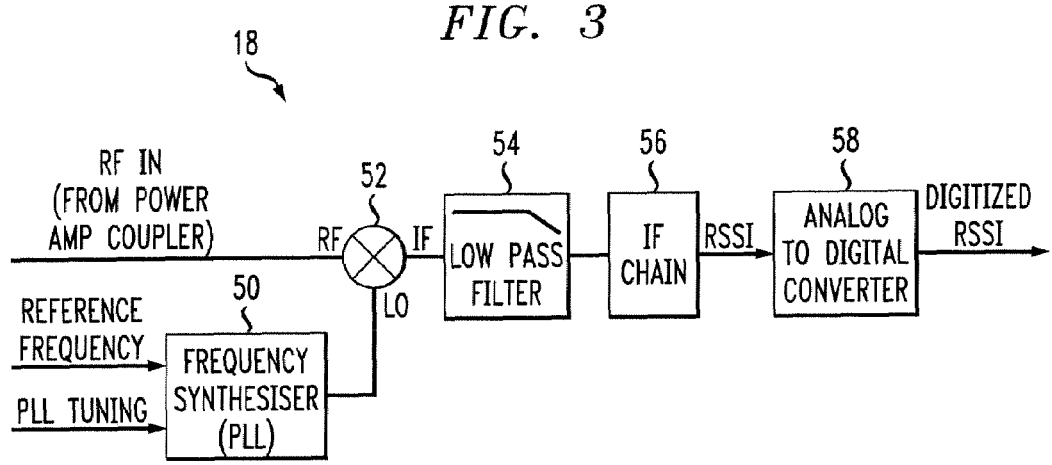
FIG. 3 is a block diagram of a receiver according to the present invention.

Referring now to the drawings wherein the showings are for purposes of illustrating particular embodiments of the invention only and not for purposes of limiting same, FIG. 1 provides a view of the overall system according to the present invention. As shown, the system 10 includes a digital pre-distorter, or pre-distorting module, 12 for receiving the input signal, an IQ modulator 14 connected to the output of the module 12, an amplifier 16 connected to the output of the modulator 14, and a receiver 18 that is coupled to the output of the amplifier through a coupler 17 and fed back to the module 12. These components are configured to apply a correction to a digital base-band signal (e.g. a code division multiple access (CDMA) signal, a wide band CDMA signal, a time division multiple access (TDMA) signal, an enhanced data rates through global system for mobile communications evolution (EDGE) signal, or any signal with a substantially large peak power to average power ratio) generated by a communication device—such as a base station used for transmitting wireless communication data—and applied to the pre-distorting module 12 as an input signal. The system also provides adaptive feedback to the system through the receiver 18 to optimize the correction.

More specifically, the technique of digital pre-distortion according to the present invention comprises applying a correction to a digital base band signal before the signal is applied to an input of the amplifier 16 such that the correction is equal and opposite to the distortion produced by the amplifier 16. Thus, the correction and the amplifier distortion cancel one another, resulting in a system with an overall linear transfer characteristic. The correction of the signal is advantageously performed on the digital base-band signal before it is converted to RF to take advantage of the precision and low cost of digital circuits.

According to the present invention, in order to correct the amplifier non-linearity discussed above, both the magnitude and the phase of the signal are pre-distorted. Both the magnitude and phase corrections vary with the instantaneous power (i.e. envelope power) and the pre-distortion circuit requires an accurate description of the amplifier magnitude and phase variation with power level to perform its function. As will be described below, the functional representation of the correction required (versus power level) is in the form of polynomial equations from which a look-up table is derived.

More particularly, the digital base-band signal is comprised of discrete-time samples of in-phase (I) and quadrature (Q) components which, after digital-to-analog conversion, are applied to the vector IQ modulator 14 to generate a RF signal. Each sample for the base-band signal can be represented in complex number notation as (I+jQ) where j is the square root of (−1). The pre-distortion operation can thus be represented as follows:

$$I'+jQ'=(I+jQ)(A+jB)$$

$$I'=IA-QB$$

$$Q'=QA+IB$$

where I' and Q' are the pre-distorted in-phase and quadrature base-band signals and A and B are pre-distortion parameters which are a function of the instantaneous envelope power. Conveniently, A and B are stored in a look-up table (which is generated as described below) with the index being the instantaneous envelope power given by $(I^2+Q^2)$.

Referring now to FIG. 2, the pre-distorting module 12 according to the invention takes a form as shown. The module 12 includes an equalization filter 20 for receiving the signal that is comprised of the in-phase and quadrature components described above. The equalization filter is a component that is well known in the art and is operatively connected to a clipping module 22 that clips the signal to a predetermined threshold to generate a clipped signal. The output of the clipping module 22 is fed to a low-pass filter module 24 that eliminates the high frequency components that are generated based on the clipping.

The low-pass filter module 24, which produces a filtered signal, is connected at its output to a sampling module 26. The sampling module 26 provides an up-sampled signal (e.g. increases the sampling rate from 2× to 8×) to an index calculating module. An index value is calculated based on the in-phase component and the quadrature component of the base-band signal. The calculating module is connected to a look-up table 30 having stored therein parameters. The parameters are retrieved based on the index value calculated.

The pre-distortion parameters A and B of look-up table 30 are derived from a set of polynomial equations that closely approximate the corrections necessary to linearize the amplifier characteristics. Because of the complex nature of the characteristics of class AB amplifiers, advantageous results are obtained by using a pair of polynomial equations for the B parameters while a single polynomial equation is sufficient for the A parameters (as an approximation, it can be said that the A parameters correct the magnitude distortion of the amplifier and the B parameters correct the phase distortion). These polynomial equations can be written as follows:

$$A=C_0+C_1P+C_2P^2+C_3P^3 \text{ for } A \leq A_m$$

$$A=A_m \text{ otherwise}$$

$$B=C_4P+C_5P^2+C_6P^3 \text{ for } P \leq P_b$$

$$B=(B_{b1}-B_{b2})+C_7P+C_8P^2+C_9P^3 \text{ for } P>P_b$$

where $P=(I^2+Q^2)$ is the instantaneous envelope power, $A_m$ is a maximum value imposed on A to prevent the amplifier from being driven deep into saturation, $P_b$ is a breakpoint where the B parameter transitions from one polynomial equation to the other, $B_{b1}$ and $B_{b2}$ are the values of B at $P=P_b$ using the first and second polynomial, respectively, and $C_0$ through $C_9$ are coefficients which pertain to a particular amplifier and which can vary with temperature, aging of the amplifier components, etc. Of course, it should be appreciated that, in appropriate circumstances, two (2) equations may be used for the A parameter as well as for the B parameter.

To accommodate the time-varying nature of the coefficients, an adaptive scheme is employed in the present invention whereby the values of the coefficients are constantly optimized (or operated on) to maintain minimum or reduced ACP. As illustrated in FIG. 1, a coupler 17 at the output of the amplifier 16 samples the output and the receiver 18, which is tuned to the frequency region where the ACP is to be reduced or minimized, generates a voltage proportional to the received power. Multiple receivers can be used to sample the ACP at more than one frequency or a single receiver can tune sequentially to the frequencies of interest. The voltages obtained at the different frequencies are then combined into a single quantity whose value is to be reduced or minimized. When two frequencies are used, which is generally sufficient, the resultant voltages, $V_1$ and $V_2$, can be combined as follows:

$$V=V_1+V_2+|(V_1-V_2)|$$

where $|(V_1-V_2)|$ is the absolute value of $(V_1-V_2)$. Such use of an absolute value causes both $V_1$ and $V_2$ to be reduced or minimized instead of simply providing the sum of the two values.

A suitable algorithm to find the values of the coefficients that reduce or minimize V, and thus the ACP, is the well known Simplex algorithm, described by Nelder and Mead in "A Simplex Method For Function Minimization," Computer Journal, Vol. 7, pp. 308-313 (1965), which is hereby incorporated herein by reference. As will be described below, the algorithm is implemented in modified form.

Referring back now to FIG. 2, the modified Simplex algorithm is run by the processing module 32. It should be appreciated that the processing module 32 may take a variety of forms including a microprocessor, a digital signal processor or a processing circuit using FPGA devices. It should be further appreciated that the Simplex algorithm may be implemented in any suitable manner that utilizes appropriate combinations of hardware and software that will be apparent to those of skill in the art upon a reading hereof. Of course, the device used to implement the algorithm (here, module 32) should include suitable storage capacity to store and maintain the code and data necessary to run the algorithm.

At each iteration, the values of the coefficients derived by the algorithm are used in the equations for A and B described above to generate a table which is used by the algorithm for the next iteration. The algorithm is allowed to run continuously so that the coefficient values track any changes that occur over time.

The Simplex optimization algorithm as developed by Nelder and Mead was intended for minimizing or reducing function values, which were obtained by mathematical computations. An important aspect of this mode of operation is that, if a computation is repeated, the same function value is obtained. This contrasts with values obtained by measurements on operating hardware where noise and fluctuations inevitably result in varying measured values. This difference has an important consequence when an attempt is made to use the Simplex algorithm in real time on operating hardware.

The essence of the Simplex algorithm is that at each iteration, the set of coefficients which is associated with the worst function value is replaced with a new set which gives a better function value. This new value might or might not be better than the best function value obtained up to that time, but as the algorithm progresses it is expected that better and better function values will be obtained. Suppose that as a result of noise and fluctuations in the measurements an exceptionally good but erroneous value is obtained. If subsequent values obtained are all worse than this erroneous value the algorithm will converge on the erroneous value. Thus, in its conventional form, the algorithm is not suitable for use in situations where considerable fluctuations exist in the quantity being optimized or operated on as in the present case.

To circumvent this difficulty, the Simplex algorithm is used in modified form in connection with the present invention. At the end of each iteration, if the previous best value is replaced by a better value, the algorithm proceeds to the next iteration. However, if an iteration does not yield a new best value, the existing best point is re-evaluated and the new value is substituted for the previous one. Thus, the algorithm is able to recover from erroneous data due to fluctuating measurements. These fluctuations will result in a larger number of iterations being required to reach a desired point (which could be an optimum point) but will not prevent the desired point from being reached.

Another modification of the Simplex algorithm is necessary in order to enable it to operate continuously and to track changes in amplifier characteristics caused by temperature changes, aging of components or other disturbances. In the conventional implementation of the algorithm an exit criterion is established (the criterion is usually related to the fractional variation of the function values between the worst and best points of the simplex) and the algorithm terminates when the criterion is satisfied. As the desired or optimum point is approached, the algorithm reduces the size of the simplex which typically becomes very small by the time the desired point is reached. Once this happens the algorithm is no longer able to react to changes in amplifier characteristics. In the implementation of the present invention, the size of the simplex is prevented from becoming too small by comparing it to a value, such as a preset minimum value, at the start of each iteration and increasing the size to the value if it has been reduced below it. The value is chosen such that it is large enough to enable the algorithm to track changes in the amplifier characteristics but not so large that the desired (or optimum) point cannot be reached. A suitable value is one where the value of each coefficient at the worst point of the simplex differs from the corresponding value at the best point by 5 to 10 percent.

With continuing reference to FIG. 2, the look-up table 30 thus receives adaptive feedback from the processing module 32. The output of the sampling module 26 is also connected to a delay circuit 34 which is, in turn, connected to an output module 36 which is operative to generate an output signal based on the parameters retrieved from the look-up table and the upsampled signal.

Figure 8:
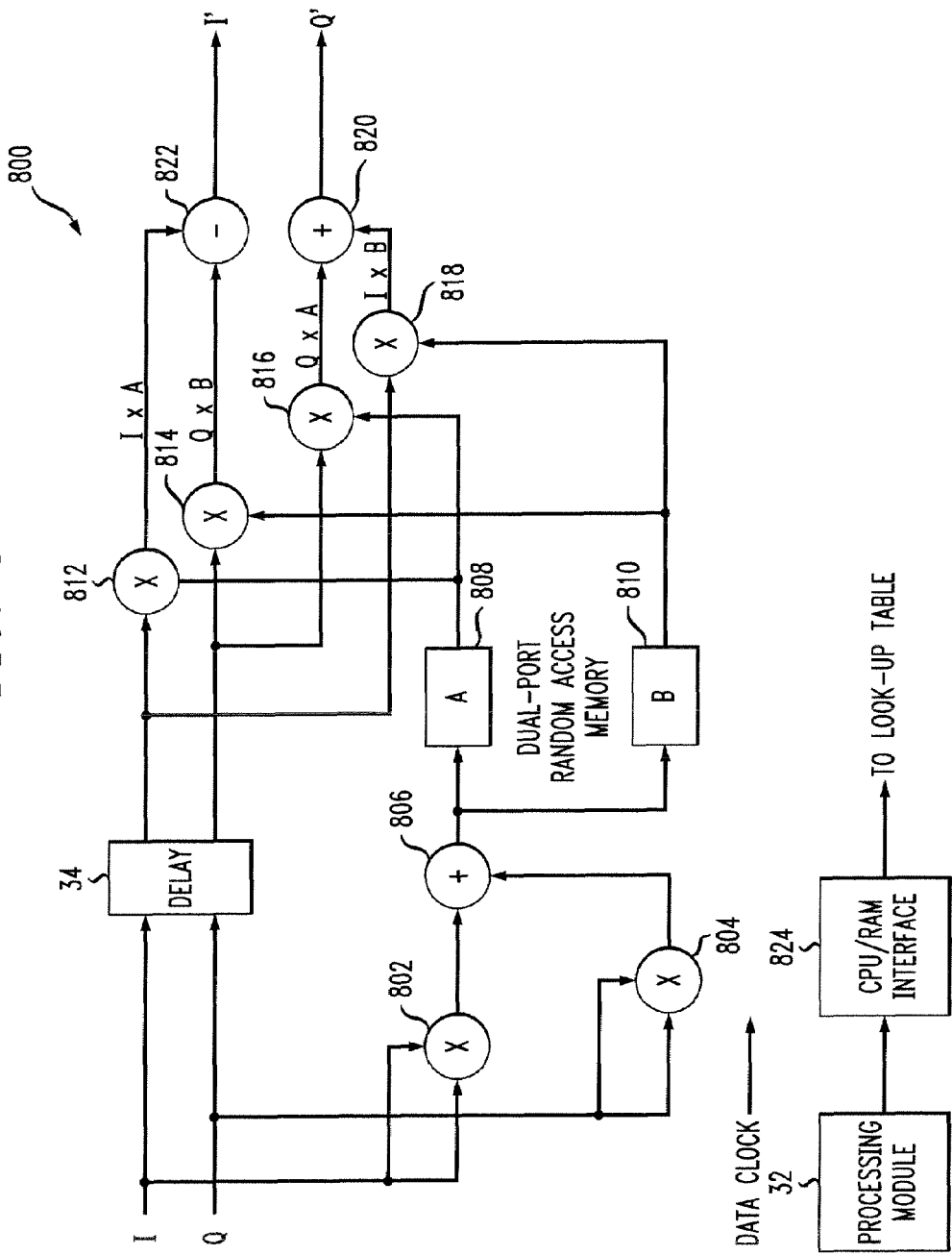

An example of a Field Programmable Gate Array implementation 800 of selected portions of FIG. 2 is shown in FIG. 8. The I and Q data paths are independently squared as shown at 802, 804 to create $I^2$ and $Q^2$. These two values are added together at 806 to form an index address for the look-up table 30 which takes the form of two separate Dual Port RAM memory blocks 808 and 810 which contain the A and the B parameters, respectively. The parameters output from the memory blocks are multiplied by both delayed I and Q values at 812, 814, 816 and 818 to create the four values I×A, I×B, Q×A, and Q×B. These are combined by adder and subtractor blocks 820 and 822 to form (IA−QB) and (QA+IB). These two values are output to give I' and Q'.

Additional circuitry 824 loads the dual-port memory blocks 808 and 810 with parameter data generated in the processing module 32 using standard memory interface signals. The use of dual port memory permits loading the parameters without disrupting the accessing of the parameters by the predistortion process.

It should be appreciated that a look-up table configuration is not necessary where, for example, the processing module has a sufficiently high processing speed to allow for the obtaining of the A and B parameters on an "as needed" basis. In this case, the processing module calculates the appropriate coefficients and the A and B parameters are subsequently calculated by the processing module as needed or desired without storing such parameters in a look-up table.

Referring back to FIG. 1, the receiver 18 in the digital pre-distortion adaptive loop is used to measure the RF power over a narrow bandwidth at a specific frequency. This tuned frequency is offset from, for example, the main CDMA carrier frequency and is a frequency where the ACP is to be minimized by the optimization algorithm.

A single-channel, single-conversion receiver 18 is shown in FIG. 3. More particularly, the receiver 18 includes a frequency synthesizer 50, which is connected to a mixer 52. The output of the mixer 52 is connected to a low-pass filter 54 which in turn is connected to an intermediate frequency (IF) chain 56. The output of the chain 56 is connected to an analog to digital converter 58 which then provides input to the processing module 32 illustrated in FIG. 2.

Three important frequencies on this block diagram are the radio frequency (RF) which is the frequency where the adjacent power level is to measured, local oscillator frequency (LO) which is varied as needed to tune the receiver, and intermediate frequency (IF) which is fixed. The required LO frequency is found by LO=RF−IF.

More particularly, the RF input of the receiver 18 is coupled off the output of the power amplifier 16. The wide band RF signal is down-converted to an intermediate frequency (IF) with a mixer 52, where IF=RF−LO. The LO for the mixer is generated by a phased locked loop (PLL) frequency synthesizer 50. This LO frequency is set by (digital) tuning commands from a microprocessor.

The low pass filter 54 is used to filter the RF+LO frequency products, as well as the RF and LO feed-through, and any higher frequency products produced by the mixer 52. The receiver IF chain 56 is shown as a single block in FIG. 3. The IF chain 56 actually includes, in one form, amplifiers and a narrow bandpass filter, which assures the power being measured is truly the power at the tuned frequency and does not contain power from, for example, the main CDMA carrier. The IF chain 56 also produces a Received Signal Strength Indicator (RSSI) output. This voltage is proportional to the IF power, which in turn is proportional to the RF power, and it is sampled with an Analog to Digital Converter (ADC). The ADC output is a digital word (which represents the power level at the tuned frequency) that is used by the optimization algorithm.

In some implementations the optimization algorithm monitors the ACP at multiple frequency points, thus the single channel receiver must be constantly re-tuned. This re-tuning can be done with a procedure similar to the following:

A microprocessor (e.g. processing module 32) sends a tuning command to the frequency synthesizer. This will set the LO frequency (and therefore the receiver's tuned frequency).

The microprocessor waits for the PLL and RSSI to settle.

The digitized RSSI value is read by the microprocessor. Multiple readings could be taken if an average RSSI is required.

These steps are repeated with the next frequency.

Figure 4:
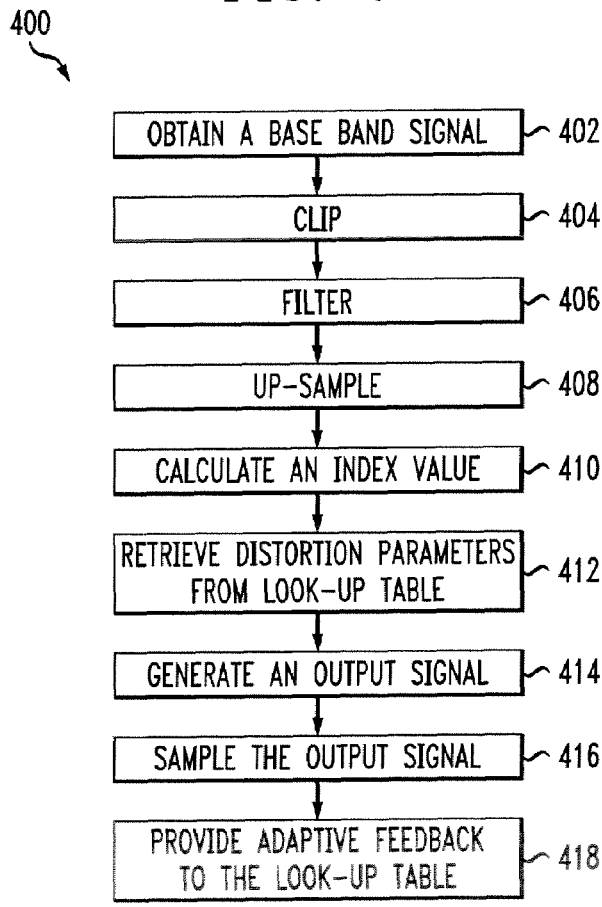
FIG. 4 is a flowchart illustrating the method according to the present invention.

In operation, with reference to FIG. 4, the system according to the present invention obtains a base-band signal (step 402). These I and Q base-band signals are initially passed through an equalization filter which has the characteristics defined in the CDMA standard IS-95 and is well known in the art.

Figure 5:
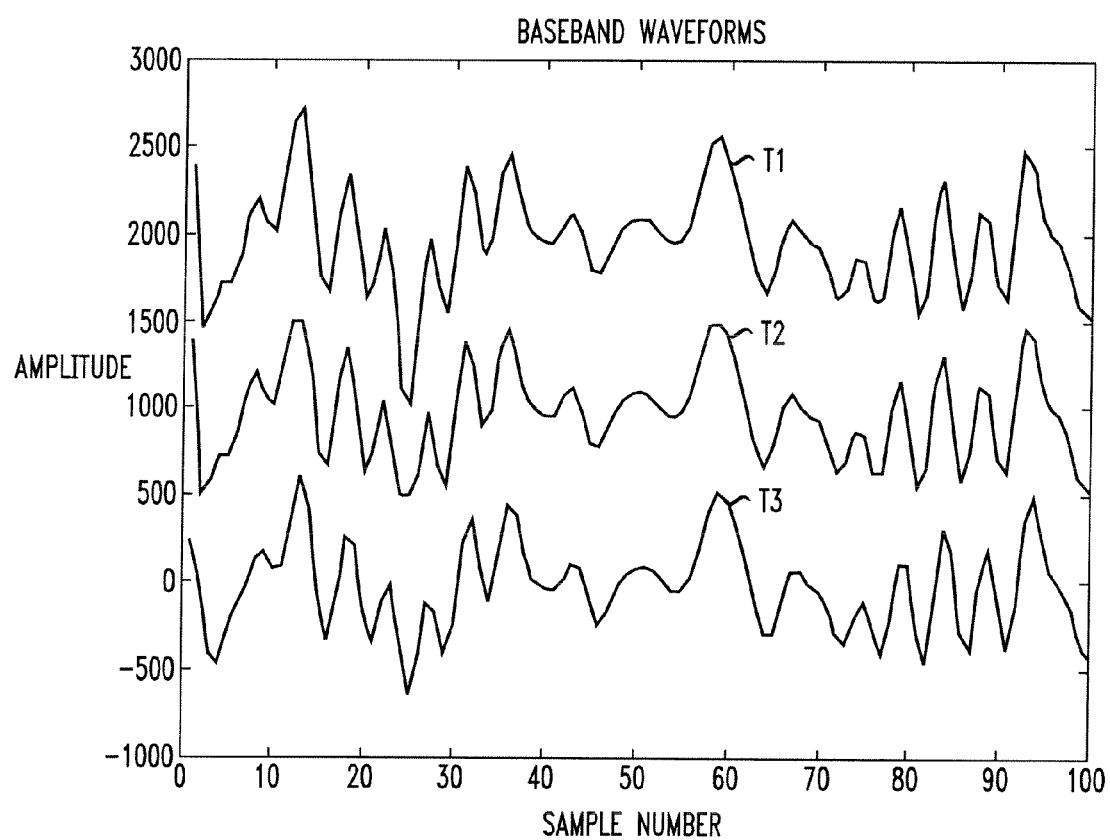
FIG. 5 is a graph illustrating base-band waveforms.
Figure 6:
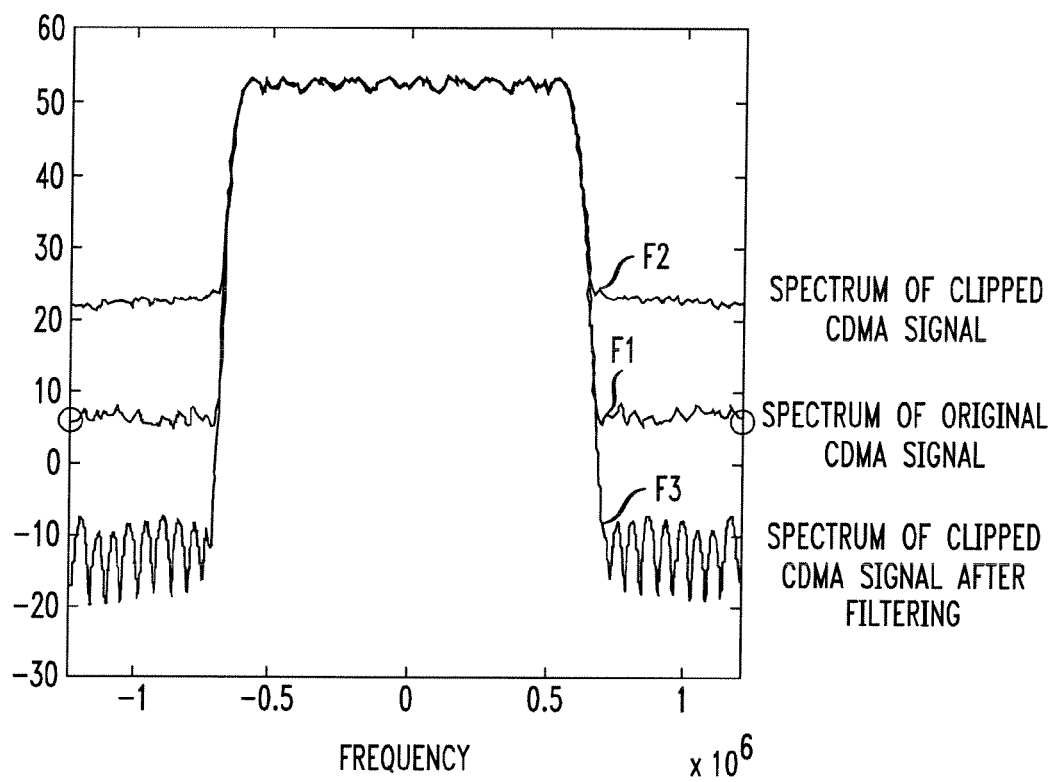
FIG. 6 is a graph showing various signals in the frequency domain according to the present invention.

The signals are then clipped (step 404) and filtered (step 406). Examples of base-band signals (e.g. the I component) T1, T2 and T3 are illustrated in the time domain in FIG. 5 where T1 is the signal before clipping, T2 is the signal after clipping but before filtering, and T3 is the signal after low pass filtering. An example of a frequency domain base-band CDMA signal F1 is illustrated in FIG. 6. The clipped signal F2 and the filtered signal F3 are also illustrated in FIG. 6 in the frequency domain.

The base-band signals are shown being clipped and filtered before being up-sampled and pre-distorted. As the power level increases, the amplifier gain becomes less, i.e. the amplifier compresses the signal at high power levels. To correct this compression, it is necessary for the pre-distorter to expand the signal, i.e. to increase the signal level at high values of $(I^2+Q^2)$. Thus, the peak power of the signal is increased by the pre-distorter that drives the amplifier further into its highly non-linear, high power region. To mitigate this effect, it is advantageous to reduce the ratio of peak power to average power of the signal before it is pre-distorted, which can be accomplished by clipping the peaks of the signal whenever they exceed a threshold value. The ACP created by the clipping operation is removed by the filter, as shown in FIG. 6.

The clipped and filtered signal is then up-sampled from the original 2× rate to an 8× rate (step 408). The up-sampling is necessary because pre-distortion, being a non-linear operation, widens the bandwidth of the signals by creating out-of-channel components (equal and opposite to those created by the amplifier) thus necessitating an increase of the Nyquist frequency.

After up-sampling, an index value, or the instantaneous envelope power, is obtained by calculating the value of $(I^2+Q^2)$ which is used as the index to the look-up table (step 410). The parameters A and B are then obtained or retrieved from the look-up table 30 using the calculated index value (step 412) and used to generate the output base-band signals I' and Q' by operating on delayed samples of I and Q according to the equations above (step 414). The delay block 34 (FIG. 2) compensates for the time required to compute $(I^2+Q^2)$ and to retrieve A and B from the table so that the I and Q samples reach the output block 36 synchronously with A and B.

The output signal is subsequently output and sampled by the receiver 18 (step 416). The receiver 18, via the implementation of the modified Simplex algorithm through the processing module 32, then provides adaptive feedback to the look-up table 30. The distortion parameters are thus adaptively modified to provide optimum ACP reduction for the system.

Figure 7:
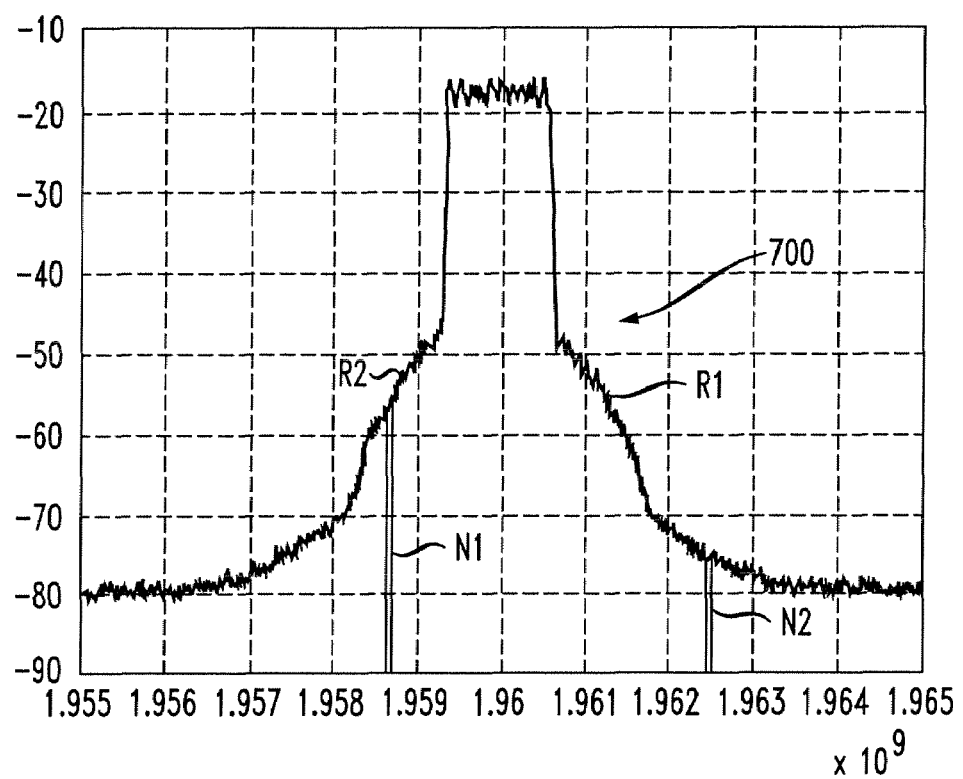
FIG. 7 is a graph illustrating a CDMA signal generated according to the present invention; and, FIG. 8 is a block diagram of selected portions of FIG. 2.

A representative CDMA frequency spectrum 700 is shown in FIG. 7. As shown, exemplary spectral re-growth regions R1 and R2 are generated. In addition, two narrow-band frequencies N1 and N2 where the ACP (or spectral growth power) could be measured or sampled using the receiver 18 are illustrated. The actual bandwidth of the two points shown on the graph is not necessarily to scale.

As described thus far, the method of the invention is designed to provide the best possible correction of the non-linearities of the amplifier by pre-distorting both the magnitude of the base band signal (primarily done by the A parameter) as well as the phase (primarily done by the B parameters). There are, however, applications where the characteristics of the signal (ratio of peak power to average power close to 1 as in a single channel TDMA (time domain multiple access) system) do not allow substantial expansion of the magnitude so that the magnitude non-linearity of the amplifier cannot be corrected as fully as might be desired. In these applications substantial improvement can be obtained by correcting the phase fully (via the B parameter) and correcting the magnitude partially by appropriate setting of the $A_m$ value.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. An apparatus for adaptively predistorting a base-band signal having an in-phase component and a quadrature component, the signal being generated by a communication device, the apparatus comprising:

a clipping module operative to clip the base-band signal to produce a clipped signal;

a filter module operative to filter the clipped signal to eliminate high frequency components of the clipped signal and to produce a filtered signal;

a sampling module to increase the sampling rate of the filtered signal to obtain an upsampled signal;

an index calculating module operative to calculate index values based on the in-phase component and quadrature component of the base-band signal;

a look-up table having stored therein parameters, the parameters being retrievable based on the index values;

an output module operative to generate an output signal based on the parameters retrieved from the look-up table and the upsampled signal;

a receiver operative to retrieve samples of RF signals generated based on the output signals, the receiver being tuned to at least one specific frequency offset from a carrier frequency of the output signal to measure RF power over a narrow bandwidth; and, a processor operative to provide adaptive feedback to the look-up table based on the samples, wherein the adaptive feedback is based on a Simplex-based routine for progressing toward optimization of coefficients of the parameters.

2. The apparatus as set forth in claim 1 wherein the index values are calculated by summing the squares of the inphase component and the quadrature component.

3. The apparatus as set forth in claim 1 wherein the index values are the instantaneous power envelopes of the base-band signals.

4. The apparatus as set forth in claim 1 wherein the parameters are derived from polynomial equations having the coefficients.

5. The apparatus as set forth in claim 4 wherein the parameters are defined as A and B and the polynomial equations are as follows:

$$A = C_0 + C_1 P + C_2 P^2 + C_3 P^3 \text{ for } A \leq A_m$$

$$A = A_m \text{ otherwise}$$

$$B = C_4 P + C_5 P^2 + C_6 P^3 \text{ for } P \leq P_b$$

$$B = (B_{b1} - B_{b2}) + C_7 P + C_8 P^2 + C_9 P^3 \text{ for } P > P_b$$

where $P = (I^2 + Q^2)$ is the instantaneous envelope power, $A_m$ is a maximum value imposed on A to prevent deep saturation, $P_b$ is a breakpoint where the B parameter transitions from one polynomial equation to the other, $B_{b1}$ and $B_{b2}$ are the values of B at $P = P_b$ using the first and second polynomial, respectively, and $C_0$ through $C_9$ are the coefficients.

6. A method for adaptively predistorting a base-band signal having an in-phase component and a quadrature component, the method comprising:
   generating the base-band signal by a communication device;
   clipping the base-band signal to produce a clipped signal;
   filtering the clipped signal to eliminate high frequency components of the clipped signal to produce a filtered signal;
   increasing the sampling rate of the filter signal to obtain an upsampled signal;
   obtaining predistortion parameters by calculating an index value based on in-phase and quadrature components of the baseband signal and retrieving parameter values based thereon;
   outputting an output signal based on the predistortion parameters and the upsampled signal;
   sampling RF signals generated based on the output signals to measure RF power at specified frequencies in a narrow bandwidth, the specified frequencies being offset from a carrier frequency of the output signal; and,
   providing adaptive feedback based on the sampling, wherein the adaptive feedback is based on a Simplex-based routine for progressing toward optimization of coefficients of the parameters.

7. The method as set forth in claim 6 wherein the increasing of the sampling rate comprises increasing the sampling rate by a factor of four.

8. The method as set forth in claim 6 wherein the obtaining of the parameters includes calculating the index value by summing squares of the in-phase component and the quadrature component.

9. The method as set forth in claim 8 wherein the obtaining further comprises retrieving the parameters from a look-up table.

10. The method as set forth in claim 6 further comprises deriving the parameters from polynomial equations having the coefficients.

11. The method as set forth in claim 10 wherein the parameters are derived by defining the parameters as A and B and manipulating the polynomial equations as follows:

$$A = C_0 + C_1 P + C_2 P^2 + C_3 P^3 \text{ for } A \leq A_m$$

$$A = A_m \text{ otherwise}$$

$$B = C_4 P + C_5 P^2 + C_6 P^3 \text{ for } P \leq P_b$$

$$B = (B_{b1} - B_{b2}) + C_7 P + C_8 P^2 + C_9 P^3 \text{ for } P > P_b$$

where $P = (I^2 + Q^2)$ is the instantaneous envelope power, $A_m$ is a maximum value imposed on A to prevent deep saturation, $P_b$ is a breakpoint where the B parameter transitions from one polynomial equation to the other, $B_{b1}$ and $B_{b2}$ are the values of B at $P = P_b$ using the first and second polynomial, respectively, and $C_0$ through $C_9$ are the coefficients.

12. The method as set forth in claim 6 further comprising delaying input of the up-sampled signal to the output module.

13. A method for adaptively predistorting a base-band signal having an in-phase component and a quadrature component, the method comprising:
   obtaining predistortion parameters based on the in-phase component and the quadrature component by calculating an index value based on in-phase and quadrature components of the baseband signal and retrieving parameter values based thereon wherein the parameters are derived from polynomial equations having coefficients and wherein the parameters are derived by defining the parameters as A and B and manipulating the polynomial equations as follows:

$$A = C_0 + C_1 P + C_2 P^2 + C_3 P^3 \text{ for } A \leq A_m$$

$$A = A_m \text{ otherwise}$$

$$B = C_4 P + C_5 P^2 + C_6 P^3 \text{ for } P \leq P_b$$

$$B = (B_{b1} - B_{b2}) + C_7 P + C_8 P^2 + C_9 P^3 \text{ for } P > P_b$$

where $P = (I^2 + Q^2)$ is the instantaneous envelope power, $A_m$ is a maximum value imposed on A to prevent deep saturation, $P_b$ is a breakpoint where the B parameter transitions from one polynomial equation to the other, $B_{b1}$ and $B_{b2}$ are the values of B at $P = P_b$ using the first and second polynomial, respectively, and $C_0$ through $C_9$ are the coefficients;
   outputting an output signal based on the predistortion parameters;
   sampling RF signals generated based on the output signal to measure RF power at specified frequencies in a narrow bandwidth, the specified frequency being offset from a carrier frequency of the output signal; and,
   providing adaptive feedback based on the sampling.

14. The method as set forth in claim 13 further comprising:
   generating the base-band signal by a communication device;
   clipping the base-band signal to produce a clipped signal;
   filtering the clipped signal to eliminate high frequency components of the clipped signal to produce a filtered signal; and,
   increasing the sampling rate of the filter signal to obtain an upsampled signal, wherein the outputting is also based on the upsampled signal.

15. The method as set forth in claim 13 wherein the obtaining of the parameters includes calculating the index value by summing squares of the in-phase component and the quadrature component.

16. The method as set forth in claim 15 wherein the obtaining further comprises retrieving the parameters from a look-up table.

17. A system for adaptively pre-distorting a base-band signal having an in-phase component and a quadrature component, the system comprising:
   means for calculating an index value based on the in-phase component and quadrature component;
   means for retrieving parameters from a look-up table, the retrieving being based on the index values;
   means for outputting an output signal based on the parameters retrieved from the look-up table and an up-sampled signal;
   means for sampling RF signals generated based on the output signals; and, means for providing adaptive feedback to the look-up table based on the sampling.

18. The system as set forth in claim 17 further comprising:

means for generating the base-band signal by a communication device;

means for clipping the base-band signal to produce a clipped signal;

means for filtering the clipped signal to eliminate high frequency components of the clipped signal to produce a filtered signal; and, means for increasing the sampling rate of the filtered signal to obtain the up-sampled signal.

* * * * *